Patented Mar. 3, 1953

2,630,408

UNITED STATES PATENT OFFICE 2,630,408

FAT COMPOSITION

Charles H. Lighthipe, Bloomfield, William M. Nothum, Elizabeth, and Clinton E. Retzsch, Bloomfield, N. J., assignors to Nopco Chemical Company, Harrison, N. J., a corporation of New Jersey No Drawing. Application January 30, 1948, Serial No. 5,514

8 Claims. (Cl. 252—8.57)

The present invention relates to solubilized fatty compositions and the treatment of hides, skins and textiles with these materials.

In the past, various solubilized oils and fats, including sulfated products, have been used in the fat liquoring of hides and skins in manufacturing leather and also as softening agents in the textile industry. Although different compositions have enjoyed varying degrees of success, it is well known that there is a fertile field for improvement in these as well as other applications of solubilized fats.

The first object of the invention is to provide a new water-dispersible fatty composition of matter.

The second object of the invention is to provide a new material for fat liquoring hides and skins.

The third object of the invention is to provide an improved textile softener.

Other objects of the invention will in part be obvious and will in part appear hereinafter.

The present invention concerns sulfated derivatives of a mixture of natural fats or oils and the oxidation and polymerization products of naturally occurring fats and oils in which the viscosities of said mixtures are less than 2500 Saybolt seconds at 100° Fahrenheit. Products derived from mixing an unsulfated blown fat or oil with these sulfated derivatives are also included in this invention which additionally encompasses fat liquoring with these novel compositions.

The invention accordingly comprises a composition of matter possessing the characteristics, properties and the relation of components and the application of the composition to fat liquoring which will be exemplified in the composition and treatment hereinafter described and the scope of the invention will be indicated in the claims.

It is to be understood that the expression "fat" is used herein in its generic sense to include not only solid glycerides of animal, vegetable and marine origin, but also liquid glycerides, free fatty acids and the monohydric alcohol esters which occasionally accompany these glycerides, as, for example, in sperm oil. The term "blown oil" and "blown fat" are used throughout this application to include not only the oxidized and/or polymerized products of oils or fats through which air has been blown, but also materials of like nature which have been produced by other methods. Thus although natural moellon degras is obtained as a by-product of fish oils employed in the manufacture of chamois leathers; it may also be accurately described as a blown fat. In producing chamois the skins are hung up to dry in the open air after being thoroughly soaked in aqueous dispersions of fish oils; and, under these conditions, it is not surprising that a considerable amount of the fatty material is oxidized and/or polymerized to substances of the same type as those obtained in blowing an oil with air. While the composition of natural moellon degras has not been completely analyzed, it is known that substantial amounts of oxidation and/or polymerization products of glycerides are produced.

The new compositions comprise water-dispersible mixtures of a sulfated raw fat and sulfated oxidized and/or polymerized fats as well as mixtures therewith of oxidized and/or polymerized fats which have not been sulfated. The sulfated components of these mixtures are produced in a simple, direct sulfation procedure which does not require either extreme conditions or unnecessary additives such as inert diluents.

Although the uses of these new products have not yet been fully explored, they have been found to possess outstanding characteristics as fat liquoring agents in leather manufacture and also as textile softeners. It is also likely that they will prove to be of importance in other utilizations where other sulfated fatty substances have been employed in the past. To mention only a few of such uses, it appears that the novel compositions herein disclosed, will be valuable as constituents of cosmetics, lubricants for textile yarns, emulsifying agents for dispersing a wide variety of insoluble materials in water, additives for increasing the pliability of coating compositions for paper, plasticizers for starch and adhesives, and in breaking petroleum emulsions.

The basic raw or naturally occurring fats suitable for the general purposes of this invention include substantially all of the liquid and solid oils derived from animal, vegetable or marine sources. Those of marine origin comprise, inter alia, cod, herring, pilchard, sperm, menhaden and sardine oils. Among the many appropriate fats from the animal family are neat's-foot oil, horse's foot oil, sheep's foot oil, mutton tallow, beef tallow, bone fat, lard oil and goose fat. Examples from the vegetable category include castor, peanut, olive, mustard seed, rape seed, cotton seed, soya bean, oiticica, tea seed, coconut, palm, palm kernel, sunflower seed and like oils. It is to be understood that these materials are not only suitable as the raw oils to be sulfated in preparing the new compositions but also serve as the raw materials for preparing the oxidized and/or polymerized fats, mentioned herein as blown fats, both sulfated and unsulfated. It is to be noted that the moellon degras, both natural and artificial, is of marine or fish origin.

Not all of the glyceride fats are suitable for each and every purpose to which the new compositions might be put, but this does not mean that some glyceride oils or fats lack utility here. For example, certain oils tend to darken during sulfation and their sulfated derivatives would be useless in the fat liquoring of light colored leather due to the attendant staining of the hides; however, even these darkened fatty materials can be utilized in making industrial and darker grades of leather as well as for other purposes to which the novel substances lend themselves.

In preparing fat liquors, the ultimate raw materials present in appreciable amounts should have iodine values of at least 60, and the preferred ranges of iodine numbers are 80 to 110 for vegetable fats and 120 to 160 for marine oils. In addition, the pour point of these basic fatty materials is preferably not above 15° C. for best results. However, raw materials of higher pour point do not render the eventual fat liquor inoperative but merely render it somewhat less effective. In selecting the basic ingredients for sulfated fatty materials of this invention intended for use in textile softening, the above limitations do not apply except that a dark softening agent would not be used on white or other light colored textile materials.

In the compositions described herein, some of these artificial moellons have proved to be superior to a natural moellon degras. The preferred moellon for use in the new composition of the present invention is a clear, dark red liquid with a specific gravity of .965/60° F. and a viscosity of 140 to 150 Saybolt seconds at 100° C., i. e., at 212° F. This product is hereinafter referred to as "dry blown artificial moellon" as it is obtained by blowing air through substantially water-free herring oil containing about 10% free fish oil fatty acids. Blown peanut and like vegetable oils are also highly recommended for both the sulfated and unsulfated blown fat components.

It has been found that the difficulties previously encountered in attempts to sulfate blown oils do not arise where the blown fat is first mixed to proper viscosity with a raw or natural oil or fat, and that conventional sulfation procedure can be followed provided that the velocity of the starting mixture is not too high. Inasmuch as blown fats are considerably more viscous than the corresponding raw fats and sulfation further increases the viscosity of both raw and blown oils, practical commercial sulfation procedure sets limits on the viscosity of the fatty mixtures to be sulfated. The upper limit permissible with the present invention is 2500 Saybolt seconds at 100° F. However, it is preferred to sulfate mixtures of blown and raw fats in which the viscosity ranges from 300 to 600 Saybolt sec./100° F. If this principle is violated, it is possible to obtain sulfated fat compositions which are of such heavy consistency and which are so gummy that the product must be dug out of the reaction vessel. Although it might be thought that only the raw oil in this mixture of raw and blown oils would be sulfated under such circumstances, this is not the case as analyses have indisputably shown that both the raw and the blown oils or fats are sulfated.

In connection with employing the present products for fat liquoring, control of the total acid value, which is the measure of the combined fatty acid and free fatty acid content of the mixture, has been found essential to obtaining proper results. When the total acid value (T. A. V.) of the sulfated constituents of the fat liquor is outside of the range 35 to 60, it has been found that the take up of fatty material from the fat liquor decreases. Where the major portion of the fats are of vegetable origin, a total acid value of 45 to 50 affords the best results. When the fats are chiefly glycerides obtained from marine sources, a T. A. V. of 50 to 55 is preferred. An exception to this rule exists for sperm oil, apparently due to its ester content, as a T. A. V. as low as 35 provides good results when substantial quantities of sperm oil or its derivatives are in the fatty composition. However, in the case of other uses as exemplified by textile softening, the T. A. V. of the sulfated ingredients appears to be of no consequence.

The degree of sulfation is also considered of importance; however, the rather wide range of 1 to 6 per cent organic $SO_3$ based on the total weight of fatty derivatives present will accomplish the purposes of the present invention to an appreciable extent. The preferred range of $SO_3$ contents is from 2 to 4 per cent on the same basis.

It is well known that natural moellon degras may contain as much as about 25% to 30% water. It is also well known in the sulfation art that a glyceride oil should be relatively water-free when it is subjected to sulfation or otherwise sufficient excess sulfuric acid to combine with the water must be used or sulfation will not proceed satisfactorily. Ordinarily, if an oil has a water content in excess of 1% to 2%, it is much better to remove the major portion of the water prior to sulfation than it is to use excess sulfuric acid to combine with the water since a much better quality product is obtained if the water is removed prior to the sulfation. Consequently, if the blown fatty material which is used in the sulfation reaction is a natural moellon degras, it should preferably be dried to a water content not in excess of about 1% prior to being sulfated.

In addition to the two-component mixtures in which both fats are sulfated, this invention also encompasses three-component mixtures in which a blown fat is incorporated into the sulfated fatty derivatives by simple mixing. In the case of textile softeners, the added fat appears to reduce the cost of the final product without decreasing its softening effect to any appreciable degree. Moreover, the blown oil decreases the viscosity of the composition which is often desirable. The incorporation of the unsulfated blown oil or fat into the sulfated mass produces an unexpected result where fat liquoring is concerned, as superior fat liquoring is attained in respect to feel, softness and color over the two-component product.

The proportions of the ingredients of the novel compositions also have a considerable effect on the resulting properties; but comparatively wide ranges may be employed so long as the rules set down above in connection with the viscosity of the mass to be sulfated are followed. For each 100 parts by weight of the raw oil (prior to sulfation) from 20 to 200 parts of blown fat should be added in preparing the mixture to be sulfated and the best results are obtained when this blown fat is present in from 40 to 70 parts by weight. Where an unsulfated blown fat is to be incorporated, 5 to 100 parts thereof may be used but the range of 10 to 80 parts is recommended, based as before on 100 parts of raw oil in the sulfated mass.

A standard fat liquoring test was employed using hides of the greatest uniformity of characteristics available in evaluating all of the compositions found in the examples below. Vegetable-tanned splits were pre-soaked in warm water and then fat liquored in laboratory equipment with 10% by weight of the fat liquoring agent based on the wet drained weight of the leather; the agent being emulsified in a suitable quantity of water. Each test included leather from three different areas of the hide . . . back, flank, and belly. The samples were fat liquored at 120° F. for 1½ hours and then dried by three different procedures. One sample was oiled off and tacked to dry; the second sample was set-out, and the third sample was tack dried "as is." In this manner a fairly complete picture of performance of the various agents was obtained, for afterward the fat content of the exhausted fat liquor was analyzed to determine the "take up" of each fat liquoring agent.

For a fuller understanding of the nature and objects of the invention, reference should be had to the following examples which are given merely to further illustrate the invention and are not to be construed in a limiting sense, all parts given being by weight.

Example I

| | Parts by weight |
|---|---|
| Fish oil | 100.0 |
| Artificial moellon degras—dry blown | 54.0 |
| Sulfuric acid—66° Bé | 38.5 |

The mixture of fish oil and moellon had a viscosity of approximately 450 Saybolt sec./100° F. The sulfuric acid was slowly stirred into the fats while cooling to keep the temperature from exceeding 18° C. After all of the acid had been added, mixing was continued at 20° C. for a total time of 2 hours. At the end of this time the sulfated mass was poured into a solution of 11.5 parts of sodium chloride in 300 parts of water. This mixture was allowed to settle until the T. A. V. reached 50. Thereafter the reaction products were neutralized, washed with water and allowed to stand overnight at an alkalinity of 0.15–0.20% calculated as potassium hydroxide in order to separate water. The sulfated fatty mixture was drawn off with a moisture content of 9% and a 2% ammonium hydroxide solution was added to raise the pH to 5.9. Analysis showed the total alkali content to be 0.5% and the organic $SO_3$ 3.6% on the dry basis. The product was miscible with water and a 5% aqueous emulsion was observed to be translucent and stable.

The standard fat liquoring test described above produced leather of very good feel and very good color; foaming of the fat liquor was observed.

Example II

| | Parts by weight |
|---|---|
| Fish oil | 100.0 |
| Artificial moellon degras—dry blown | 54.0 |
| Sulfuric acid—66° Bé | 38.5 |
| Natural moellon degras | 58.0 |

The oil and artifical moellon were reacted with the acid in the manner set forth in Example I except that the sulfation time was 1½ hours, the total acid value was 57 and the pH of the clear product was adjusted to 6.15.

The natural moellon was mixed into the sulfated mixture along with sufficient water to maintain the moisture content of 30%.

In the fat liquoring test, leather of substantially the same quality as in Example I was obtained.

Example III

| | Parts by weight |
|---|---|
| Fish oil | 400 |
| Artificial moellon degras—dry blown | 216 |
| Sulfuric acid—66° Bé | 154 |

The sulfation procedure of Example I was followed here except that the reaction mixture was divided into two equal portions which were treated to provide total acid values of 54.9 and 68.8 respectively; each of these halves was then divided into two equal batches.

One batch having a T. A. V. of 54.9 was mixed with 35 parts of unsulfated artificial moellon degras (dry blown). Upon fat liquoring with an aqueous emulsion of this composition, the resulting leather was observed to have excellent feel and softness as well as excellent light color.

Example IV

The second quarter of the sulfation products of Example III (T. A. V.—54.9) was mixed with 35 parts of natural moellen degras from chamois. The fat liquoring test resulted in a leather of very good feel and very good color. However, the results were inferior to those obtained in Example III; hence the artificial moellon degras was considered superior to the natural product as a diluent for the sulfated mass so far as leather treating was concerned.

Example V

The third quarter of the sulfated reaction products of Example III had a total acid value of 68.8 and was mixed with 17.5 parts of dry blown (unsulfated) artificial moellon. Although leather obtained from fat liquoring by the standard procedure with this mixture in emulsion had a very good color and a good feel, it was inferior to that produced in Example III. It is believed that the increased T. A. V. had a deleterious effect on the lubrication of the fibers in the hide.

Example VI

The fourth batch (T.A.V.—68.8) of products of the sulfation reaction conducted in Example III was mixed with 17.5 parts of natural moellon. Fat liquoring with this composition produced a leather of good color but dry in feel; and the take up of oil by the leather was found to be less than any of the foregoing examples. The leather here was inferior to that produced in all preceding examples and this tends to confirm the conclusions drawn in respect to Examples IV and V.

Example VII

| | Parts by weight |
|---|---|
| Fish oil | 100 |
| Artificial moellon degras—dry blown | 70 |
| Sperm oil | 30 |
| Sulfuric acid—66° Bé | 50 |

The above mixture of three fats with a viscosity of about 340 Saybolt sec./100° F. was sulfated in the manner described in Example I but the mass was controlled to a total acid value of 39. 37.5 parts of unsulfated artificial moellon were stirred into the sulfated products and well lubricated leather of excellent feel and color was obtained by fat liquoring with an aqueous emulsion of this fatty mixture. This was somewhat surprising as the take up of oil by the leather was below that obtained with the previous fat liquors.

*Example VIII*

The sulfation reaction of Example VII was duplicated in all respects except that the maximum temperature was 25° C., a T. A. V. of 48.2 was chosen as the end point of the reaction, and the products were allowed to pan or stand overnight with a total alkalinity of 0.25% KOH.

30 parts of fish oil fatty acids (serving as a blending agent) and 42 parts of artificial moellon were added to the sulfation reaction products with thorough stirring. The leather which was fat liquored with this composition had the same excellent feel, softness and light color obtained in Examples III and VII despite a somewhat lower take up of available oil in the fat liquor than in Example III.

*Example IX*

| | Parts by weight |
|---|---|
| Peanut oil | 600 |
| Blown peanut oil—1200 Saybolt sec./100 F | 324 |
| Sulfuric acid—66° Bé | 231 |

The raw and blown peanut oil mixture with a viscosity in the neighborhood of 360 Saybolt sec./100° F. was sulfated in accordance with the procedure of Example I with two exceptions; the reaction mixture was split into two equal portions which were adjusted to total acid values of 46.0 and 56.0 respectively and the concentration of sodium chloride in the wash water was doubled. The organic SO₃ content of the batch having a T. A. V. of 56.0 was found by analysis to be 6.12%. Each of the two batches was divided into thirds to form a total of 6 equal portions.

30.5 parts of unsulfated blown peanut oil (1200 Saybolt sec./100° F.) formed a clear mixture with one of the 46.0 T. A. V. batches, and the leather produced using this mixture as the fat liquor had the same excellent characteristics as the leathers of Examples III, VII and VIII. This was rather surprising inasmuch as vegetable oils are usually inferior to fish oils for fat liquoring operations.

*Example X*

One batch of the sulfated reaction products of Example IX with a T. A. V. of 56.0 was mixed with 30.5 parts of fresh blown peanut oil (1200 Saybolt sec./100° F.). In the fat liquoring test, the leather obtained had a very light color and a very good feel although slightly inferior to the leather of Example IX in this respect. It was felt that the lower T. A. V. of the final product of Example IX accounted for the somewhat better results there.

*Example XI*

The second batch of the sulfated raw-blown oil mixture of 46.0 T. A. V. of Example IX was evaluated as a textile softener by dipping cotton swatches into a 3% aqueous dispersion thereof at 70° C. and passing the swatches through a wringer so as to give a net take up of the aqueous dispersion of the sulfated oil mixture equal to the weight of the cotton swatches, i. e. a 100% take up of the dispersion. In comparison with an established textile softener consisting of a mixture of sulfated (unblown) vegetable oils, the mixture described in this example was found distinctly superior for softening the cotton and equal in resistance to yellowing and rancidity.

*Example XII*

41 parts of the aforementioned blown peanut oil were thoroughly mixed into the third 46.0 T. A. V. batch of sulfated raw-blown oil mixture of Example IX. Upon duplicating the tests on textiles set forth in the preceding example, the same excellent results as in Example XI were observed here.

In all of the above examples, no foaming of the aqueous emulsions was observed where the active agent contained an unsulfated blown fat.

Since certain changes in carrying out the above process and certain modifications in the composition embodying the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; and that they are intended to be inclusive in scope and not exclusive, in that if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. A composition of matter which comprises the sulfated derivatives of a mixture having a viscosity less than 2500 Saybolt seconds at 100 degrees Fahrenheit of 100 parts by weight of a naturally occuring fat and from 20 to 200 parts by weight of a blown fat selected from the group consisting of natural moellon degras and dry blown artificial moellon degras, and said sulfated derivatives having an organic SO₃ content of from about 1 to about 6 per cent based on the weight of the sulfated derivatives.

2. A composition of matter which comprises the sulfated derivatives of a mixture having a viscosity ranging from 300 to 600 Saybolt seconds at 100 degrees Fahrenheit of 100 parts by weight of a naturally occurring fat and 40 to 70 parts of a blown fat selected from the group consisting of natural moellon degras and dry blown artificial moellon degras, and said sulfated derivatives having an organic SO₃ content of from about 1 to about 6 per cent based on the weight of the sulfated derivatives.

3. A composition which comprises from 5 to 100 parts by weight of a blown fat and the sulfated derivatives of a mixture having a viscosity less than 2500 Saybolt seconds at 100 degrees Fahrenheit of 100 parts of a naturally occurring fat and from 20 to 200 parts of a blown fat said blown fat in each case being selected from the group consisting of natural moellon degras and dry blown artificial moellon degras, and said composition having an organic SO₃ content of from about 1 to about 6 per cent based on the total weight of said blown fat and sulfated derivatives.

4. A composition which comprises from 5 to 100 parts by weight of a blown fat and the sulfated derivatives of a mixture having a viscosity ranging from 300 to 600 Saybolt seconds at 100 degrees Fahrenheit of 100 parts of a naturally occurring fat and from 40 to 70 parts of a blown fat; said composition having an organic $SO_3$ content of from 1 to 6 per cent based on the total weight of said blown fat and sulfated derivatives, and said blown fat in each case being selected from the group consisting of natural moellon degras and dry blown artificial moellon degras.

5. A fat liquoring composition which comprises a composition containing from 5 to 100 parts by weight of a blown fat and the sulfated derivatives of a mixture having a viscosity less than 2500 Saybolt seconds at 100 degrees Fahrenheit of 100 parts of a naturally occurring fat and from 20 to 200 parts of a blown fat; each of said fats originally having in its raw natural state an iodine value of at least 60; said composition having a total acid value of from 35 to 60 based on the weight of the sulfated derivatives and an organic $SO_3$ content of from 1 to 6 per cent based on the total weight of said blown fat and sulfated derivatives, and said blown fat in each case being a dry blown artificial moellon degras.

6. A fat liquoring composition which comprises a composition containing from 10 to 80 parts by weight of a blown fat and the sulfated derivatives of a mixture having a viscosity ranging from 300 to 600 Saybolt seconds at 100 degrees Fahrenheit of 100 parts of a naturally occurring fat and from 40 to 70 parts of a blown fat; each of said fats originally having in its raw natural state an iodine value of at least 60; said composition having a total acid value of from 35 to 60 based on the weight of the sulfated derivatives and an organic $SO_3$ content of from 2 to 4 per cent based on the total weight of said blown fat and sulfated derivatives, and said blown fat in each case being a dry blown artificial moellon degras.

7. A composition according to claim 5 in which said total acid value is from 45 to 50 and in which at least 50% of the weight of said sulfated fat derivatives are of vegetable origin.

8. A composition according to claim 6 in which said total acid value is from 50 to 55 and in which at least 50 percent of the weight of said sulfated fat derivatives are glycerides of marine origin.

CHARLES H. LIGHTHIPE.
WILLIAM M. NOTHUM.
CLINTON E. RETZSCH.

REFERENCES CITED

The following references are of record in the file of this patent:

UNITED STATES PATENTS

| Number | Name | Date |
|---|---|---|
| 1,988,905 | Kroch et al. | Jan. 22, 1935 |
| 2,007,958 | Auer | July 16, 1935 |
| 2,180,256 | Printon | Nov. 14, 1939 |
| 2,254,713 | Stapler | Sept. 2, 1941 |
| 2,283,540 | Davis | May 19, 1942 |
| 2,344,154 | Lighthipe | Mar. 14, 1944 |

FOREIGN PATENTS

| Number | Country | Date |
|---|---|---|
| 526,960 | Great Britain | Sept. 30, 1940 |